Aug. 1, 1933.  W. L. GORDEN  1,920,924
ROTARY VALVE
Filed Nov. 8, 1929  2 Sheets-Sheet 1
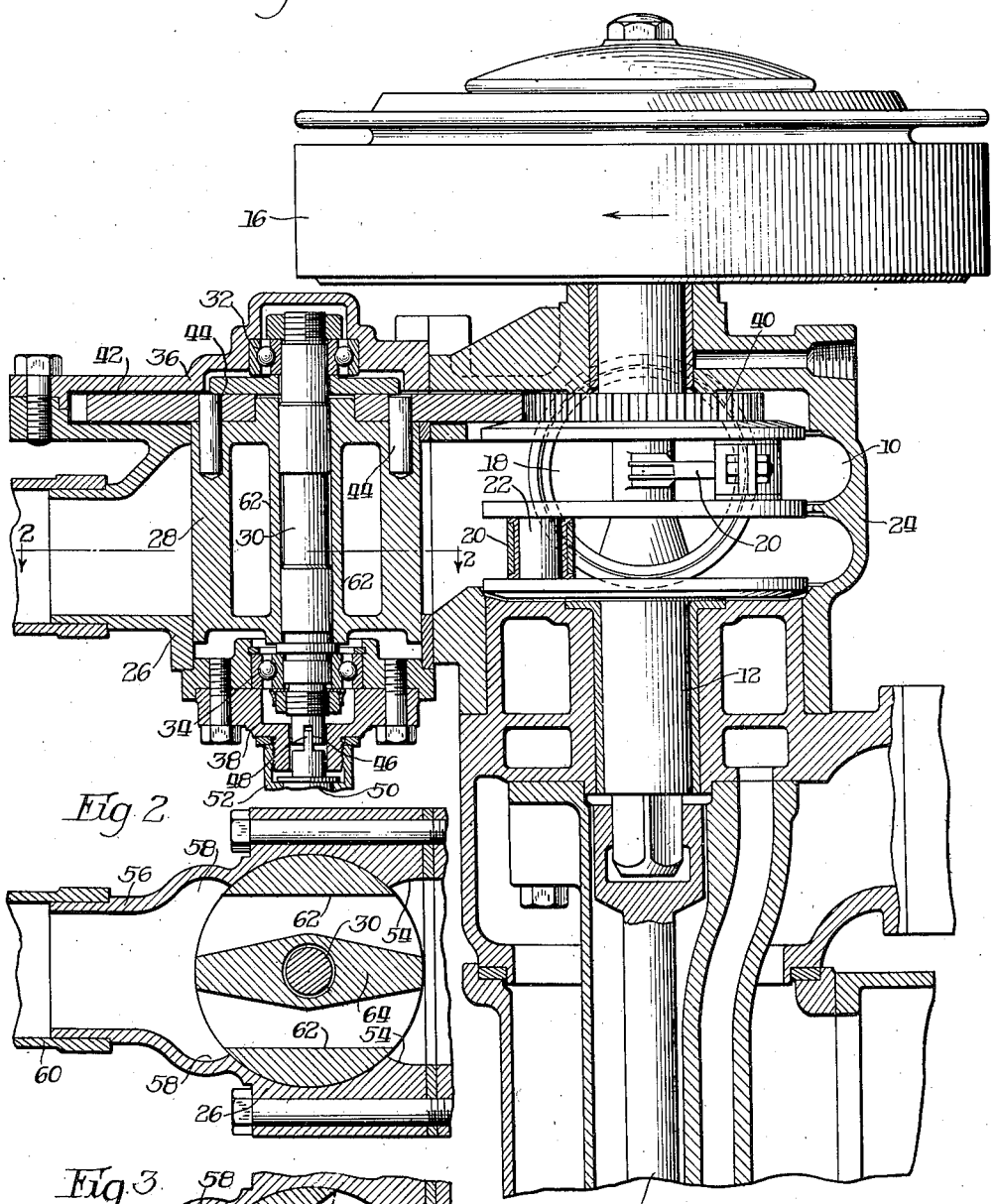
Inventor:
Walter L. Gorden
By Kent W. Wonnell  Atty Aug. 1, 1933.  W. L. GORDEN  1,920,924
ROTARY VALVE
Filed Nov. 8, 1929  2 Sheets-Sheet 2
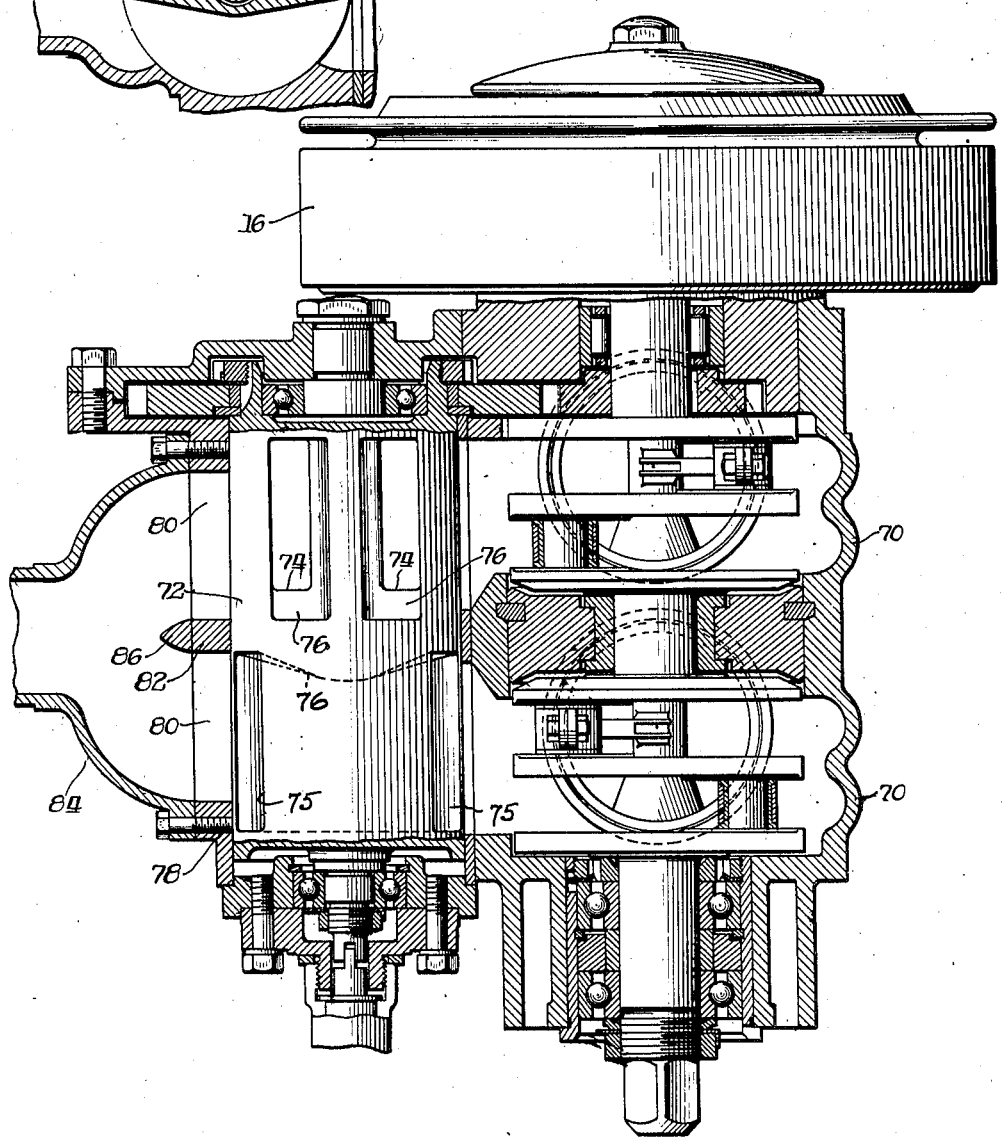
Inventor.
Walter L Gorden
By Kent W. Wonnell  Atty Patented Aug. 1, 1933

1,920,924

UNITED STATES PATENT OFFICE 1,920,924

ROTARY VALVE

Walter L. Gorden, Waukegan, Ill., assignor to Johnson Brothers Engineering Corporation, Waukegan, Ill., a Corporation of Indiana Application November 8, 1929. Serial No. 405,680

3 Claims. (Cl. 123—190)

This invention relates to a rotary valve for internal combustion engines and the like.

One of the principal objects of the invention is in the provision of a rotary valve structure which gives a full valve opening for a minimum angular movement of the valve.

A further object of the invention is in the provision of a quick opening and closing rotary valve.

A still further object of the invention is in the provision of a valve in which wear and noise are reduced.

A further object is in the provision of a rotary valve which gives a full valve opening at each half rotation through the same passage in reverse directions.

A further object of the invention is in the provision of a rotary valve having a complete passage comprising a plurality of smaller passages.

Still another object of the invention is in the provision of a rotary valve structure which is compactly arranged upon a valve body to receive fuel from a single source and distribute it to a plurality of cylinders.

These and other objects will be apparent from the description and from the drawings illustrating preferred embodiments of the invention.

In the drawings Fig. 1 is a sectional view of the upper portion of an outboard motor assembly embodying a rotary valve structure in accordance with this invention: Fig. 2 is a section of the valve taken on the line 2—2 of Fig. 1: Fig. 3 is a section similar to that of Fig. 2 showing the valve body in closing position: and Fig. 4 is a view similar to Fig. 1 illustrating the invention as applied to a four cylinder outboard motor; and Fig. 5 is a section similar to Fig. 2 showing a valve body without side walls.

This valve is described as a fuel admission valve for the crankcase of a 2-cycle combustion engine, particularly of the outboard motor type. Engines of this type are required to run at high speed and one of the objections heretofore found in rotary valves is that the valves are required to travel at too high a peripheral speed, thereby resulting in excessive wearing of the gears, and making a loud and objectionable noise. Further objection to high speed rotary valves is that it is difficult to obtain and maintain a full port opening for the passage of fuel and to quickly close the port opening.

In a 2-cycle engine, fuel must be admitted to the crankcase for each rotation of the crank shaft which requires opening and closing of the rotary valve for each rotation of the crank shaft. In the present invention, this is accomplished and the above mentioned objections are overcome by providing a valve body with divided transverse passages which together form a complete fuel passage reversing therefor its ends at each half rotation of the valve body. This is effected by means of a half speed reduction gearing connecting the valve body to the crank shaft so that the body is rotated at one half the speed of the crankshaft.

Referring now more particularly to the drawings, a power head assembly of an outboard motor is shown in Figs. 1 and 4 comprising a motor 10 having a vertical type crank shaft 12, the lower end of which is operative connected with a vertical drive shaft 14 and the upper end of which supports a combined fly wheel and magneto 16.

The motor shown in Fig. 1 is of the opposed cylinder type having opposite pistons 18 (only 1 shown) connected by piston rods 20 to the crank pins 22 of the crank shaft 12.

The crank shaft is mounted in a closed crank case 24 at one side of which is a rotary valve assembly comprising a casing 26 with a vertical bore to receive a rotary valve 28. The valve body is mounted upon a vertical shaft 30 having roller bearing mountings 32 and 34 at the top and bottom respectively held in place by top and bottom plates 36 and 38. Mounted on the crank shaft is a gear 40 meshing with a gear 42 of twice the diameter and contained in a space at the top of the valve 28 between its casing 26 and the top plate 36. This gear 42 is secured to the valve body in any suitable manner, as for example, by means of pins 44 which extend through the gear into a suitable recess in the valve body, the pins being held against dislodgment therefrom by means of a washer plate extending around the shaft 30 at the top of the gear 42.

At the bottom of the valve shaft 30, a slot 46 may be provided for receiving a corresponding tongue 48 of a tachometer shaft 50 which is held in engagement by means of a threaded nut 52.

At one side of the valve casing 26, the sides are cut away to form a valve opening 54 and at opposite side of the valve casing is a hollow admission stem 56 having a port opening 58, the stem being adapted to receive a tubular connection 60 from a mixing device such as a carburetor.

The body of the valve 28 is provided with transverse passages 62 divided by a central partition 64 which is wider at the center to provide a sufficient stock thickness of material for inserting the shaft 30 therethrough. The passages in the valve body together form a complete fuel passage between the casing ports 54 and 58, the ends of the fuel passage being altered every half revolution of the valve so that fuel passing to the crankcase will pass through the valve passages first in one direction and then the other.

One of the principal objects in providing the divided passages in the valve is apparent from Figs. 2 and 3 in which it will be seen that in order to completely open and close the valve passages, it is only necessary to move the valve an angular distance embraced by the arc at the end of one of the passages as designated by the angle $a$ in Fig. 3, whereas if there were no central partitions, it would be necessary to rotate the valve an angular distance of more than twice this amount to open and to close the valve. Obviously this is of great importance for quick opening and closing of the valve and for obtaining a full port opening as quickly as possible. It is particularly advantageous for use with a rotary valve structure which is operated at one half of the engine speed.

A similar construction and arrangement is shown in Fig. 4 as applied to a four cylinder type of outboard motor assembly having a double crankcase 70 and a double valve body 72 with openings 74 and 75 therein similar to the valve openings shown in Fig. 1, valve openings for the different casing portions however being at right angles to each other and the adjacent ends 76 of the valve openings 74 and 75 being rounded to divide and divert the fuel to the separate casing portions. This valve casing 78 for this structure has a pair of openings 80 corresponding to the valve openings 74 and 75 and a central partition 82 forming a substantial continuation of the adjacent valve passage ends 76. A single manifold 84 may be applied to the casing 78 over the openings 82 for receiving fuel from a single mixing device and cross piece 86 may be provided which registers with the partition 82, preferably pointed at the admission end so that fuel entering therein will be divided and diverted in a smooth line through the valve passages.

Instead of the valve body being formed with side walls and transverse openings 62, the walls may be omitted leaving only a body 88 with its central partition 64 as shown in Fig. 5. With this form the compression in the crank case of the engine is less, the volumetric efficiency may be reduced, but the weight is reduced, and the width of the partition and the ports govern the timing of the valve as in the single and double forms shown.

With these constructions, it is obvious that the rotation of the valve body is at one half of the engine speed thereby reducing the peripheral speed of the valve, decreasing the noise and wear of the gears; that the same valve passages are used each half rotation of the valve body, the direction of fuel there through being reversed; and the valves being quickly opened and closed in a short angular distance because of the division of the passages by the center partition.

I claim:

1. A rotary valve assembly comprising a casing having an inlet port and an outlet port, and a valve body rotatable therein having only a diametric partition which forms a plurality of openings with the casing walls in which it is rotated together constituting a double passage which connects the inlet and outlet twice each rotation of the body.

2. A rotary valve assembly comprising a casing having a single inlet and a single outlet, a valve body rotatable therein having double ports entirely open and unobstructed between the casing walls in which it is rotated but divided by a single diametric longitudinal partition.

3. A quick-acting rotary valve comprising a casing having an inlet port and an outlet port, a valve body rotatable therein having only a diametric partition forming side passages entirely unobstructed between the partition and the walls of the casing in which the valve body is rotated together forming a complete valve opening adapted to reduce the angular movement necessary to open and close the ports.

WALTER L. GORDEN.